US011119390B2

(12) United States Patent
Liu et al.

(10) Patent No.: US 11,119,390 B2
(45) Date of Patent: Sep. 14, 2021

(54) PHOTOGRAPHING DEVICE AND UNMANNED AERIAL VEHICLE

(71) Applicant: SZ DJI TECHNOLOGY CO., LTD., Shenzhen (CN)

(72) Inventors: Hao Liu, Shenzhen (CN); Xifeng Zhao, Shenzhen (CN); Ran Liao, Shenzhen (CN); Xin Chen, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/747,785

(22) Filed: Jan. 21, 2020

(65) Prior Publication Data

US 2020/0159090 A1 May 21, 2020

Related U.S. Application Data

(63) Continuation of application No. PCT/CN2017/095313, filed on Jul. 31, 2017.

(51) Int. Cl.
*G03B 17/55* (2021.01)
*B64C 39/02* (2006.01)
*B64D 47/08* (2006.01)

(52) U.S. Cl.
CPC .............. *G03B 17/55* (2013.01); *B64C 39/02* (2013.01); *B64D 47/08* (2013.01); *B64C 2201/123* (2013.01); *B64C 2201/127* (2013.01)

(58) Field of Classification Search
CPC ............................................. B64C 2201/123
See application file for complete search history.

(56) References Cited

U.S. PATENT DOCUMENTS

| 3,421,721 | A | 1/1969 | Miller | |
|---|---|---|---|---|
| 9,838,078 | B2* | 12/2017 | Bennett | H04B 3/50 |
| 10,099,785 | B1* | 10/2018 | Gonzalez | B64C 39/024 |
| 10,836,508 | B2* | 11/2020 | Overall | G03B 15/006 |

(Continued)

FOREIGN PATENT DOCUMENTS

| CN | 101766049 A | 6/2010 |
|---|---|---|
| CN | 203299507 U | 11/2013 |

(Continued)

OTHER PUBLICATIONS

Wei Chen, et al., Happy and Fun Playing Digital Video, Oct. 2003, p. 23, Chongqing Publishing House, China.

(Continued)

*Primary Examiner* — Paulos M Natnael
(74) *Attorney, Agent, or Firm* — Anova Law Group, PLLC (57) ABSTRACT

A photographing device includes a camera module assembly, a glass disposed external to the camera module assembly to protect the camera module assembly, and a temperature sensor configured to detect an internal temperature of the photographing device. The photographing device also includes a heating element disposed on the glass. The photographing device further includes a controller configured to obtain the external temperature and to control the heating element to heat the glass when a difference between the internal temperature and the external temperature reaches a predetermined temperature.

10 Claims, 6 Drawing Sheets

(56) References Cited

U.S. PATENT DOCUMENTS

| | | | |
|---|---|---|---|
| 2011/0019062 A1* | 1/2011 | Honda | H04N 5/2254 |
| | | | 348/335 |
| 2011/0062135 A1 | 3/2011 | Duchayne et al. | |
| 2011/0115972 A1 | 5/2011 | Voges | |
| 2015/0207964 A1* | 7/2015 | Bye | B64D 47/08 |
| | | | 348/211.99 |
| 2018/0205242 A1* | 7/2018 | Kelly-Morgan | H01G 4/18 |
| 2019/0362473 A1* | 11/2019 | Scott | G06K 9/00664 |
| 2020/0062393 A1* | 2/2020 | Yoon | G05D 1/101 |
| 2020/0122830 A1* | 4/2020 | Anderson | B60L 53/50 |
| 2020/0225684 A1* | 7/2020 | Anderson | B64F 3/02 |

FOREIGN PATENT DOCUMENTS

| | | |
|---|---|---|
| CN | 205193411 U | 4/2016 |
| CN | 106125464 A | 11/2016 |
| CN | 106488089 A | 3/2017 |
| CN | 106547284 A | 3/2017 |
| CN | 106559607 A | 4/2017 |
| JP | 2004258293 A | 9/2004 |
| WO | 2005060312 A1 | 6/2005 |
| WO | 2016164173 A1 | 10/2016 |

OTHER PUBLICATIONS

World Intellectual Property Organization (WIPO) International Search Report for PCT/CN2017/095313 dated May 3, 2018 6 Pages.

* cited by examiner

PHOTOGRAPHING DEVICE AND UNMANNED AERIAL VEHICLE

CROSS-REFERENCE TO RELATED APPLICATION

This application is a continuation application of International Application No. PCT/CN2017/095313, filed on Jul. 31, 2017, the entire content of which is incorporated herein by reference.

TECHNICAL FIELD

The present disclosure relates to the technical field of photographing devices and, more particular, to a photographing device and an unmanned aerial vehicle ("UAV").

BACKGROUND TECHNOLOGY

When a camera is used in a work environment that has a relatively large difference (e.g., temperature difference), such as high sky, deep sea, raining days, or cold areas, the camera typically has features such as a small volume, and a large amount of heat generation. The camera tends to fog, which may affect the photographing effect.

SUMMARY

In accordance with an aspect of the present disclosure, there is provided a photographing device including a camera module assembly. The photographing device also includes a glass disposed external to the camera module assembly to protect the camera module assembly. The photographing device also includes a temperature sensor configured to detect an internal temperature of the photographing device. The photographing device also includes a heating element disposed on the glass. The photographing device further includes a controller configured to obtain the external temperature and to control the heating element to heat the glass when a difference between the internal temperature and the external temperature reaches a predetermined temperature.

In accordance with another aspect of the present disclosure, there is provided an unmanned aerial vehicle ("UAV"). The UAV includes a gimbal and a photographing device disposed on the gimbal. The photographing device includes a camera module assembly and a glass disposed external to the camera module assembly to protect the camera module assembly. The photographing device also includes a temperature sensor configured to detect an internal temperature of the photographing device. The photographing device also includes a heating element disposed on the glass. The photographing device further includes a controller configured to obtain the external temperature and to control the heating element to heat the glass when a difference between the internal temperature and the external temperature reaches a predetermined temperature.

BRIEF DESCRIPTION OF THE DRAWINGS

The above and/or additional aspects and advantages of the present disclosure will become evident and easy to understand in the descriptions of the embodiments with reference to the following accompanying drawings, where.

MAJOR COMPONENTS AND DESCRIPTION OF LABELS

| Photographing device | 10 |
|---|---|
| Camera module assembly | 11 |
| Circuit board | 12 |
| Imaging sensor | 114 |
| Lens module assembly | 116 |
| Glass | 12 |
| First external surface | 122 |
| Second external surface | 124 |
| Temperature sensor | 13 |
| Heating element | 14 |
| Resistor | 142 |
| Conductive coating | 144 |
| Controller | 15 |
| Front cover | 16 |
| Receiving space | 162 |
| Dust-proof cotton | 17 |
| Back cover | 18 |
| Sealing glue | 19 |
| Hygroscopic material | 20 |
| Gimbal | 30 |
| UAV | 100 |

DETAILED DESCRIPTION OF THE EMBODIMENTS

Embodiments of the present disclosure will be described in detail. Examples of the embodiments are illustrated in the accompanying drawings, where, the same or similar labels consistently indicate the same or similar components or components having the same or similar functions. The embodiments described below with reference to the accompanying drawings are illustrative, and are only used to explain the present disclosure, and should not be understood as limiting the present disclosure.

In the descriptions of the embodiments of the present disclosure, it should be understood, that the orientation or location relationship indicated by the terms "center," "longitudinal," "lateral," "length," "width," "thickness," "up," "down," "front," "back," "left," "right," "vertical," "horizontal," "top," "bottom," "inside," "outside," "clockwise," "counter-clockwise," etc., is an orientation or location relationship based on what is shown in the drawing. The terms are only used for the convenience of describing the embodiments of the present disclosure and for the simplicity of the descriptions, and do not indicate or imply that the device or component referred to must include a specific orientation, or be configured or operated with a specific orientation. Therefore, these terms should not be understood as limiting the embodiments of the present disclosure. In addition, terms such as "first," "second" are only used for descriptive purposes, and should not be understood as indicating or implying relative importance or implicitly indicating the quantity of the modified technical features. As such, features modified by "first," "second" may indicate or implicitly include one or more such features. In the description of the embodiments of the present disclosure, the term "multiple" means two or more, unless there is another express and specific limitation.

In the description of the embodiments of the present disclosure, it should be noted that unless there is express definition and limitation, the terms "mount," "couple," "connect" should be interpreted broadly. For example, the connection described by these terms may be a fixed connection, a detachable connection, or an integral connection. The connection described by these terms may be a mechanical connection, or an electrical connection or communicative connection. The connection described by these terms may be a direct connection, an indirectly connection through an intermediate medium, or an internal connection of two components or an interactive relationship between the two components. For a person having ordinary skills in the art, the specific meaning of the terms in the embodiments of the present disclosure can be understood based on specific situations.

In the embodiments of the present disclosure, unless there is other express definition and limitation, a first feature being "on" or "under" a second feature may include the situation where the first and second features directly contact with one another, or may include the situation where first and second features do not directly contact with one another but indirectly contact with one another through a feature other than the first and second features. In addition, the first feature being "above," "over," and "on" the second feature may include the situation where the first feature is disposed right above or is disposed slantly above the second feature. In some embodiments, these terms may merely indicate that the horizontal height of the first feature is higher than that of the second feature. The first feature being "below," "under," "underneath" the second feature may include the situation where the first feature is disposed right under or is disposed slantly under the second feature. In some embodiments, these terms may merely indicate that the horizontal height of the first feature is smaller than that of the second feature.

The following disclosure provides various different embodiments or examples to realize different structures of the embodiments of the present disclosure. For simplifying the disclosure of the embodiments of the present disclosure, the following texts describe the components and configurations of specific examples. These examples are only illustrative, and the purpose is not to limit the present disclosure. In addition, the embodiments of the present disclosure may use repeated reference numbers and/or reference alphabets in different examples. Such repetition is for the purpose of simplicity and clarity, and does not itself indicate a relationship between various described embodiments and/or configurations. In addition, the embodiments of the present disclosure provide examples of various specific processing and material, but a person having ordinary skills in the art can use other processings and/or other materials.

Figure 1:
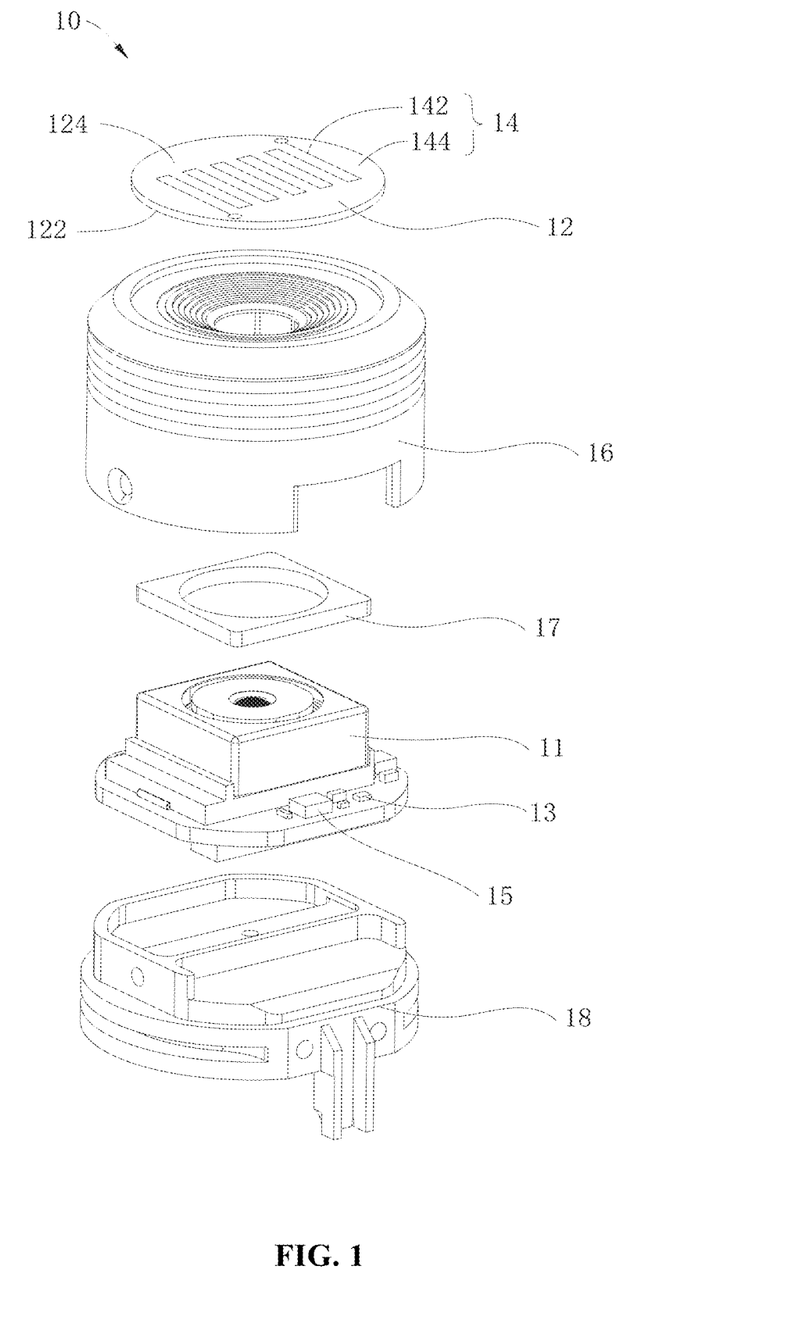
FIG. 1 is a perspective exploded view of a photographing device, according to an embodiment of the present disclosure.
Figure 2:
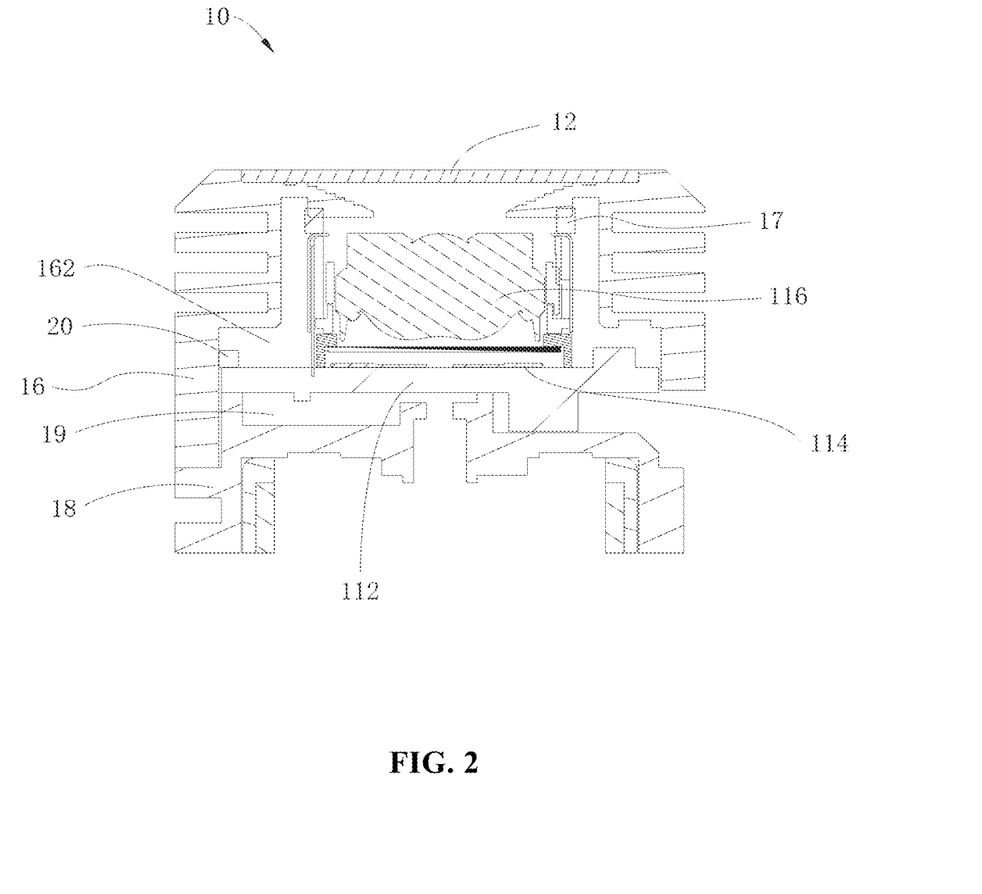
FIG. 2 is a cross-sectional view of the photographing device, according to an embodiment of the present disclosure.

Referring to FIG. 1 and FIG. 2, a photographing device 10 of the embodiments of the present disclosure may include a camera module assembly 11, a glass 12, a temperature sensor 13, a heating element 14, and a controller 15. The heating element 14 may be disposed on the glass 12. The glass 12 may be disposed external to the camera module assembly 11 to protect the camera module assembly 11. The temperature sensor 13 may be configured to detect an internal temperature of the photographing device 10. The controller 15 may be configured to obtain an external temperature and to control the heating element 14 to heat the glass 12 when a difference between the internal temperature and the external temperature reaches a predetermined temperature.

The photographing device 10 of the embodiments of the present disclosure may include the heating element 14 disposed on the glass 12. When the temperature difference between the internal and external temperatures of the photographing device 10 is overly large (e.g., reaches a predetermined temperature), the glass 12 may be heated through the heating element 14, to avoid fogging of the photographing device 10.

Figure 3:
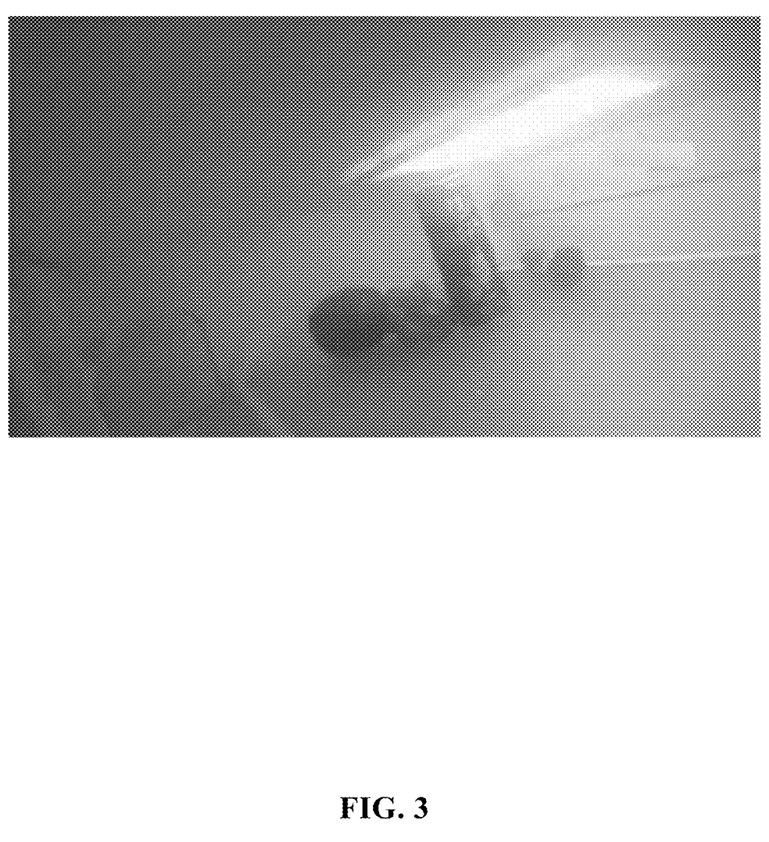
FIG. 3 is a schematic illustration of the photographing effect of a conventional photographing device.
Figure 4:
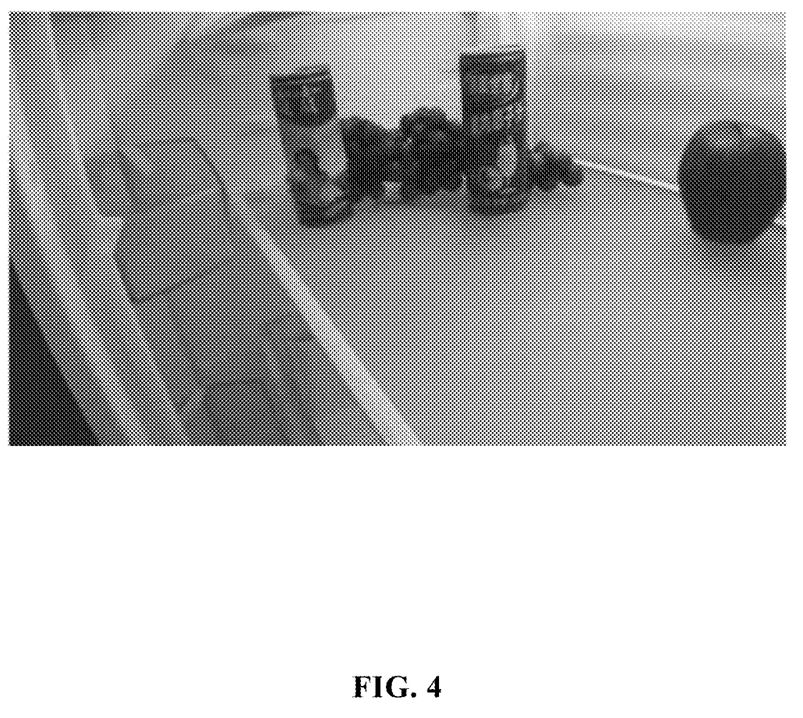
FIG. 4 is a schematic illustration of the photographing effect of the photographing device, according to an embodiment of the present disclosure.
Figure 5:
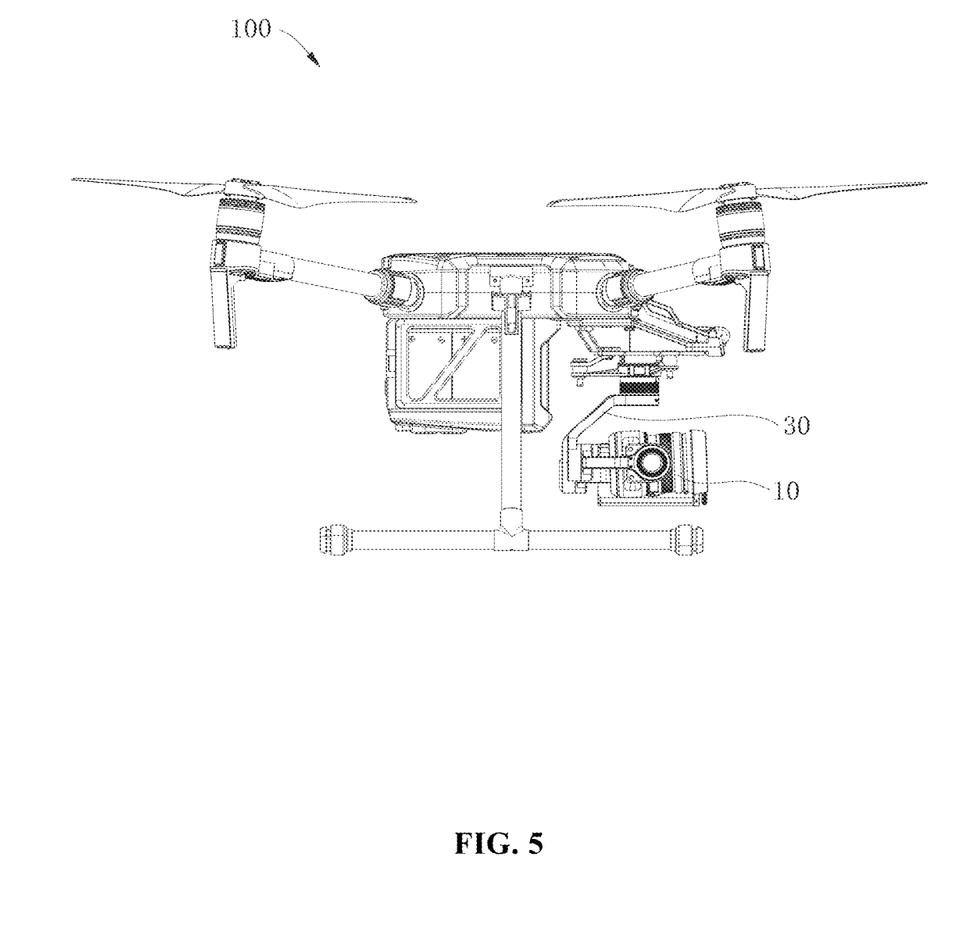
FIG. 5 is a schematic illustration of a structure of a UAV, according to an embodiment of the present disclosure.

It can be understood that when the photographing device 10 is used in a work environment having a relatively large difference (e.g., temperature difference), such as high sky, deep sea, raining days, or cold area, because the photographing device 10 typically has features such as a small volume and a large amount of heat generation. The internal temperature of the photographing device 10 may be higher than the external temperature. Water molecules inside the photographing device 10 may be condensed when touching the low-temperature glass 12. Fogy shaped water droplets may be formed on the internal surface of glass 12 adjacent the interior of the photographing device 10. When a light beam enters the camera module assembly 11 from the external environment, the light beam penetrates the water droplets and may experience changes such as refraction and reflection, thereby affecting the photographing effect. The photographing device 10 of the embodiments of the present disclosure includes a function of heating the glass 12. When the temperature difference between the internal and external temperatures of the photographing device 10 is overly large, the glass 12 may be heated through the heating element 14, to reduce the temperature difference between the glass 12 and the interior of the photographing device 10, thereby solving the fogging issue of the photographing device 10. Please refer to FIG. 3 and FIG. 4, FIG. 3 is a schematic illustration of the photographing effect of a conventional photographing device 10 implemented in a work environment having a relatively large difference (e.g., temperature difference). FIG. 4 is a schematic illustration of the photographing effect of the photographing device 10 of the embodiments of the present disclosure which has a heating function added for the glass 12, when implemented in a work environment having a relatively large difference (e.g., temperature difference). It can be seen from the figures, the photographing device 10 of the embodiments of the present disclosure does not experience fogging phenomenon, and the photographing effect is clear. In some embodiments, the photographing device 10 of the embodiments of the present disclosure may be implemented for the aerial photography of a UAV 100 (as shown in FIG. 5).

The glass 12 may be disposed external to the camera module assembly 11, to avoid dust and water from entering into the camera module assembly 11, and to avoid damages to the camera module assembly 11 by external objects. The temperature sensor 13 may be disposed inside the photographing device 10, and configured to detect an internal temperature of the photographing device 10. Specifically, the temperature sensor 13 may be disposed on the glass 12, such as a side of the glass 12 adjacent the interior of the imaging device 10, or inside the camera module assembly 11. The detailed location of the temperature sensor 13 is not limited. The controller 15 and the heating element 14 may be connected. The controller 15 may obtain the external temperature and may control the heating element 14 to heat the glass 12 when a difference between the internal temperature and the external temperature reaches a predetermined temperature. Specifically, the controller 15 may obtain the external temperature through the following methods: the controller 15 may obtain the external temperature detected by the temperature sensor disposed external to the photographing device 10; or the controller 15 may communicate or link with other devices to obtain the external temperature; or the photographing device 10 may be carried on a gimbal 30 of the UAV 100, and the controller 15 may obtain the external temperature from the main controller of the UAV 100. The location of the controller 15 may be configured on the glass 12, such as a side of the glass 12 adjacent the interior of the photographing device 10, or inside the camera module assembly 11. The detailed location of the controller 15 is not limited.

Please refer to FIG. 1 and FIG. 2, in some embodiments, the camera module assembly 11 may include a circuit board 112, an imaging sensor 114 loaded on the circuit board 112, and a lens module assembly 116 loaded on the circuit board 112. The imaging sensor 114 may be received in the lens module assembly 116.

Specifically, the imaging sensor 114 may be a Charge Coupled Device ("CCD") or a Complementary Metal Oxide Semiconductor ("CMOS"). The circuit board 112 may be a printed circuit board ("PCB"), a flexible circuit board or a soft and hard composite board. The imaging sensor 114 may be glued to the surface of the circuit board 112. The imaging sensor 114 may be electrically connected with the circuit board 112 through wires, or electrically connected with the circuit board 112 through flip chip manner, internal pin bonding, tape automatic bonding, flip bonding packaging or heat press connection method.

In some embodiments, the heating element 14 may include a resistor 142. The resistor 142 may be electrically connected with the circuit board 112. The heating element 14 may be configured to heat the glass 12 through supplying a current to the resistor 142 to generate heat to heat the glass 12.

Specifically, when the difference between the internal temperature and the external temperature reaches a predetermined temperature, e.g., 10° C., the controller 15 may control the circuit board 112 to supply a current to the resistor 142, and the heat generated by the current flowing through the resistor 142 may be used to heat the glass 12. In one embodiment, when the difference between the internal temperature and the external temperature reaches the predetermined temperature, the larger the difference between the internal temperature and the external temperature, the larger the current supplied to the resistor 142 by the circuit board 112 under control of the controller 15. As a result, rapid de-fogging can be achieved. In an embodiment, when the difference between the internal temperature and the external temperature reaches the predetermined temperature, the larger the difference between the internal temperature and the external temperature, the longer the time the current is supplied to the resistor 142 by the circuit board 112 under control of the controller 15. As a result, a long term constant temperature may be maintained for the glass 12.

In some embodiments, the resistor 142 may be disposed at an external surface of the glass 12; or the resistor 142 may be disposed inside the glass 12.

Specifically, the resistor 142 disposed at the external surface of the glass 12 may include: the resistor 142 may be disposed on a surface (a first external surface 122) of the glass 12 adjacent an interior of the photographing device 10; or the resistor 142 may be disposed on a surface (a second external surface 124) of the glass 12 adjacent an exterior of the photographing device 10; or resistors 142 may be disposed on both the surface (the first external surface 122) of the glass adjacent the interior of the photographing device 10 and on the surface (the second external surface 124) of the glass adjacent the exterior. In some embodiments, the resistor 142 may be disposed on the surface of the glass 12 adjacent the interior of the photographing device 10. In such configurations, it is convenient for the circuit board 112 to supply a current to the resistor 142, and to protect the resistor 142.

The resistor 142 being disposed inside the glass 12 may include: the resistor 142 may be embedded inside the glass 12, and may be disposed at a predetermined distance (or distances) with the first external surface 122 and the second external surface 124; or, the first external surface 122 may be provided with a groove, and the resistor 142 may be embedded within the groove of the first external surface 122 of the glass 12; or, the second external surface 124 may be provided with a groove, and the resistor 142 may be embedded within the groove of the second external surface 124 of the glass 12; or both the first external surface 122 and the second external surface 124 may be provided with grooves, and resistors 142 may be embedded within the grooves of the first external surface 122 and the second external surface 124 of the glass 12. In some embodiments, the resistor 142 may be embedded inside the glass 12 to realize uniform heating of the glass 12.

Figure 6:
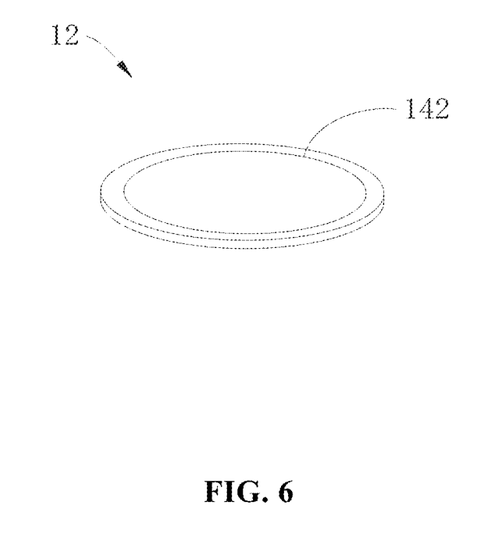
FIG. 6 is a schematic illustration of a structure of a glass, according to an embodiment of the present disclosure.

Please refer to FIG. 6, when the resistor 142 is disposed at the external surface of the glass 12 or is disposed inside the glass 12, in some embodiments, the resistor 142 may be disposed at an outer periphery of the glass 12, to avoid the resistor 142 blocking the light, which may otherwise affect the photographing effect of the photographing device 10.

Referring to FIG. 1 and FIG. 2, in some embodiments, the heating element 14 may include a conductive coating 144. The conductive coating 144 may be electrically connected with the circuit board 112. The heating element 14 may heat the glass 12 using heat generated by supplying a current through the conductive coating 144.

Specifically, the conductive coating 144 may be formed by well distributed nano conductive graphite coated particles. The conductive coating 144 has excellent static conductivity performance and cover protection performance.

When the difference between the internal temperature and the external temperature reaches the predetermined temperature, e.g., 15° C., the controller 15 may control the circuit board 112 to supply a current to the conductive coating 144, thereby generating heat by supplying the current through the conductive coating 144, which may be used to heat the glass 12. In an embodiment, when the difference between the internal temperature and the external temperature reaches the predetermined temperature, the larger the difference between the internal temperature and the external temperature, the larger the current supplied to the conductive coating 144 by the circuit board 112 under the control of the controller 15. As a result, rapid de-fogging may be achieved. In an embodiment, when the difference between the internal temperature and the external temperature reaches the predetermined temperature, the larger the difference between the internal temperature and the external temperature, the longer the time the current is supplied to the conductive coating 144 by the circuit board 112 under the control of the controller 15. As a result, a long term constant temperature may be maintained for the glass 12.

In addition, when manufacturing the photographing device 10, by changing the resistance of the conductive coating 144, the photographing device 10 can be configured for work environments having different temperature differences. For example, when the photographing device 10 is to operate in a work environment having a relatively large temperature difference, the resistance of the conductive coating 144 can be made relatively large, to better provide the de-fogging function. When the photographing device 10 is to operate in a work environment having a relatively small temperature difference, the resistance of the conductive coating 144 can be made relatively small. It should be noted that the temperature difference being relatively large and the temperature difference being relatively small discussed herein refers to the proximity of the difference between the internal temperature and the external temperature to the predetermined temperature. In some embodiments, changing the resistance of the conductive coating 144 may be realized through methods such as changing the resistivity of the conductive coating 144.

In some embodiments, the conductive coating 144 may be disposed on an external surface of the glass 12.

Specifically, the conductive coating 144 being disposed on the external surface of the glass 12 may include: the conductive coating 144 is disposed on a surface (the first external surface 122) of the glass 12 adjacent the interior of the photographing device 10; or the conductive coating 144 is disposed on a surface (the second external surface 124) of the glass 12 adjacent an exterior of the photographing device 10; or conductive coatings 144 are disposed on both the surface (first external surface 122) of the glass 12 adjacent the interior of the photographing device 10 and the surface (second external surface 124) of the glass 12 adjacent the exterior of the photographing device 10. In an embodiment, the conductive coating 144 is disposed on a surface of the glass 12 adjacent the interior of the photographing device 10. As such, it is convenient for the circuit board 112 to supply the current to the resistor 142, and to protect the conductive coating 144.

In the embodiments of the present disclosure, the conductive coating 144 may be in a transparent state. When the conductive coating 144 is coated on the external surface of the glass 12, the photographing effect of the photographing device 10 may not be affected.

In some embodiments, the heating element 14 may include the resistor 142 and the conductive coating 144. The resistor 142 may be disposed inside the glass 12. The conductive coating 144 may be disposed on the glass 12. The conductive coating 144 and the circuit board 112 may be electrically connected. The resistor 142 may be electrically connected with the circuit board 112 through the conductive coating 144. The heating element 14 may heat the glass 12 using heat generated by supplying the current to the resistor 142 and the conductive coating 144.

Specifically, in some embodiments, the resistor 142 and the conductive coating 144 may be used in combination. The conductive coating 144 may be disposed on the external surface of the glass 12, and the resistor 142 may be disposed inside the glass 12. The conductive coating 144 may be electrically connected with the resistor 142. When the difference between the internal temperature and the external temperature reaches the predetermined temperature, e.g., 20° C., the controller 15 may control the circuit board 112 to supply a current to the conductive coating 144, such that the resistor 142 is supplied with a current. The heat generated by supplying the current to the conductive coating 144 and the resistor 142 may be used to heat the glass 12. It can be understood, the situation of heating the glass 12 using the heat generated by supplying the current to the resistor 142 and the conductive coating 144 is a combination of the method of heating the glass 12 using heat generated by supplying a current to the resistor 142 and the method of heating the glass 12 using heat generated by supplying a current to the conductive coating 144, which are not described in detail here.

In some embodiments, the photographing device 10 may also include a front cover 16. The front cover 16 may be configured to cover the camera module assembly 11. The glass 12 may seal an outer side of the front cover 16 that is away from the camera module assembly 11 through a UV curable glue.

Specifically, avoiding fogging of the photographing device 10 may also be realized by reducing water content entering the interior of the photographing device 10. It can be understood, when there is fewer water molecules inside the photographing device 10, even if the difference between the internal temperature and the external temperature reaches the predetermined temperature, fogging may not occur easily to the photographing device 10.

In the embodiments of the present disclosure, by sealing the outer side of the front cover 16 that is away from the camera module assembly 11 through a UV curable glue, e.g., sealing a gap at the connection portion between the outer side of the front cover 16 and the glass 12, water content and dust may be blocked from entering the photographing device 10.

In some embodiments, the photographing device 10 may also include the front cover 16 and a dust-proof cotton 17. The front cover 16 may be configured to cover the camera module assembly 11. The dust-proof cotton 17 may be disposed between the front cover 16 and the camera module assembly 11.

Specifically, in an embodiment, the material of the dust-proof cotton 17 can include synthetic fiber, non-woven fabric, or glass fiber, etc.

In the embodiments of the present disclosure, by sealing the gap at the connection portion between the front cover 16 and the camera module assembly 11 through the dust-proof cotton 17, water content and dust can be blocked from entering the photographing device 10.

In some embodiments, the photographing device 10 may also include the front cover 16, a back cover 18, and a sealing glue 19. The front cover 16 and the back cover 18 may couple together to form a receiving space 162. The camera module assembly 11 may be received in the receiving space 162. The sealing glue 19 may be disposed between the back cover 18 and the circuit board 112.

Specifically, in an embodiment, the sealing glue 19 may include a silica gel.

In the embodiments of the present disclosure, by sealing the gap at the connection portion between the back cover 18 and the circuit board 112 through the sealing glue 19, water content and dust can be blocked from entering the photographing device 10.

In the embodiments of the present disclosure, the photographing device 10 may also include the front cover 16, the back cover 18, and a hygroscopic material 20. The front cover 16 and the back cover 18 may couple together to form the receiving space 162. The camera module assembly 11 may be received in the receiving space 162. The hygroscopic material 20 may be disposed inside the receiving space 162. The hygroscopic material 20 may be configured to remove the water content from the interior of the photographing device 10.

Specifically, in an embodiment, the material of the hygroscopic material 20 may include fiber, silicon dioxide, calcium oxide, calcium chloride, activated carbon, etc.

In the embodiments of the present disclosure, by removing water content from the interior of the photographing device 10 using the hygroscopic material 20, fogging in the photographing device 10 can be avoided.

It should be noted that the implementation of the present disclosure can be based on one or more of the above embodiments. In other words, an embodiment that is a combination of one or more of the above-described embodiments also falls within the scope of protection of the embodiments of the present disclosure.

Please refer to FIG. 1 and FIG. 5, the UAV 100 of the embodiments of the present disclosure includes the photographing device 10 and the gimbal 30 of any of the above-described embodiments. The photographing device 10 may be disposed on the gimbal 30. The gimbal 30 may be configured to stabilize the photographing device 10.

In other words, the photographing device 10 of the embodiments of the present disclosure can be used in the UAV 100 of the embodiments of the present disclosure.

In the UAV 100 of the embodiments of the present disclosure, the heating element 14 may be disposed on the glass 12. When the temperature difference between the internal temperature and the external temperature is overly large, the glass 12 may be heated through the heating element 14, to avoid fogging in the photographing device 10.

In the present disclosure, descriptions of the reference terms "an embodiment," "some embodiments," "some illustrative embodiments," "example," "specific example," or "some examples" mean that the specific feature, structure, material or characteristic described with reference to the embodiment or example are included in at least one of the embodiments or examples of the present disclosure. In the present descriptions, illustrative expression of the above terms does not necessarily indicate the same embodiments or examples. In addition, the described specific feature, structure, material or characteristic may be combined in a suitable matter in any one or multiple embodiments or examples.

Descriptions of any process or method described in a flow chart or in any other manner may be understood as representing one or more modules, segments, or parts of computer-executable codes for realizing specific logical functions or for executing specific steps. In addition, the scope of the embodiments of the present disclosure includes other implementations. Steps may not necessarily be executed in the illustrated or discussed order. For example, the functions or steps may be executed substantially simultaneously or according to a reversed order (or any other suitable orders). This should be understood by a person having ordinary skills in the art of the embodiments of the present disclosure.

The logic and/or steps shown in the flow chart or otherwise described in other manners, for example, may be regarded as a fixed-order list of executable instructions for realizing the logic functions. The logic and/or steps may be specifically implemented in any computer-readable medium, and may be used by the instruction executing system, device, or apparatus (e.g., a computer-based system, a system including a processing module, or other system that can retrieve and execute instructions from the instruction executing system, device, or apparatus), or may be used in combination with the instruction executing system, device, or apparatus. For the present specification, "computer-readable medium" may be any device that includes, stores, communicates, broadcasts or transmits programs to be used by an instruction executing system, device, or apparatus, or to be used in combination with such instruction executing system, device, or apparatus. More specific examples (non-exhausting listing) of the computer-readable medium include the following: an electrical connection portion (control method) having one or multiple wires, a portable computer disk (magnetic device), a random access memory ("RAM"), a read only memory ("ROM"), an erasable programmable read only memory ("EPROM" or flash memory), a fiber optic device, and an optic compact disk read only memory ("CDROM"). In addition, the computer-readable medium may even be paper or any other suitable medium on which programs can be printed, because, for example, optical scanning may be performed through the paper or other medium, and editing, analysis or when necessary other suitable manner may be used to process the scanned image to electronically obtain the programs, which may be stored in the computer memory.

It should be understood that the various parts of the embodiments of the present disclosure can be realized using hardware, software, firmware or their combination. In the above embodiments, multiple steps or methods can be stored in the memory and be realized by software or firmware executed by a suitable instruction executing system. For example, when realized using hardware, any one of the following techniques known in the art or their combination may be used: a discrete logic circuit having a logic gate circuit that may be configured to perform logic functions for digital signals, an application specific integrated circuit having suitable combinations of logic gate circuits, a programmable gate array ("PGA"), a field programmable gate array ("FPGA"), etc.

A person having ordinary skill in the art can appreciate that part or all of the above disclosed methods and processes may be implemented using software instructing related hardware. The program may be stored in a computer-readable storage medium. When executed, the program includes one of the steps of the embodiments or their combination.

In addition, various functional units of the various embodiments of the present disclosure can be integrated in one processing module, or may physically exist as individual units, or two or more than two units can be integrated in one module. The above integrated module can be realized in the form of hardware, or can be realized in the form of software functional module. The integrated module, if realized I the form of software functional module and sold or used as independent product, can also be stored in a computer-readable storage medium.

The storage medium mentioned above can be a read only storage device, a magnetic disk, or an optical disk, etc.

Although the above illustrated and described embodiments of the present disclosure, it can be understood that the above embodiments are illustrative, and cannot be understood as limiting the present disclosure. A person having ordinary skills in the art can modify, change, substitute and vary the above embodiments within the scope of the present disclosure.

What is claimed is:

1. An unmanned aerial vehicle ("UAV"), comprising:
a gimbal; and
a photographing device disposed on the gimbal, the photographing device including:
a camera module assembly;
a glass disposed external to the camera module assembly to protect the camera module assembly;

a temperature sensor configured to detect an internal temperature of the photographing device;

a heating element disposed on the glass; and a controller configured to obtain the external temperature and to control the heating element to heat the glass when a difference between the internal temperature and the external temperature reaches a predetermined temperature.

2. The UAV of claim 1, wherein the camera module assembly includes a circuit board, an imaging sensor loaded on the circuit board, and a lens module assembly loaded on the circuit board, and wherein the imaging sensor is received in the lens module assembly.

3. The UAV of claim 2, wherein the heating element includes a resistor electrically connected with the circuit board, and wherein the heating element is configured to heat the glass using heat generated by supplying a current through the resistor.

4. The UAV of claim 3, wherein
the resistor is disposed at an external surface of the glass, or
the resistor is disposed inside the glass.

5. The UAV of claim 2, wherein the heating element includes a conductive coating electrically connected with the circuit board, and wherein the heating element is configured to heat the glass using heat generated by supplying a current to the conductive coating.

6. The UAV of claim 5, wherein the heating element also includes a resistor disposed inside the glass, and wherein the heating element is configured to heat the glass using heat generated by supplying a current through the resistor and the conductive coating.

7. The UAV of claim 2, wherein the photographing device also includes a front cover configured to cover the camera module assembly, and wherein the glass is configured to seal an outer side of the front cover that is away from the camera module assembly through a UV curable glue.

8. The UAV of claim 2, wherein the photographing device also includes a front cover and a dust-proof cotton, the front cover covers the camera module assembly, and the dust-proof cotton is disposed between the front cover and the camera module assembly.

9. The UAV of claim 2, wherein the photographing device also includes a front cover, a back cover, and a sealing glue, and wherein the front cover and the back cover are configured to couple together to form a receiving space, the camera module assembly is received in the receiving space, and the sealing glue is disposed between the back cover and the circuit board.

10. The UAV of claim 2, wherein the photographing device also includes a front cover, a back cover, and a hygroscopic material, and wherein the front cover and the back cover are configured to couple together to form a receiving space, the camera module assembly is received in the receiving space, the hygroscopic material is disposed in the receiving space, and the hygroscopic material is configured to remove water content from an interior of the photographing device.

* * * * *